Nov. 29, 1955 — R. A. FRYKLUND — 2,725,547
TRANSDUCER EXCITING CIRCUITS
Filed April 13, 1951
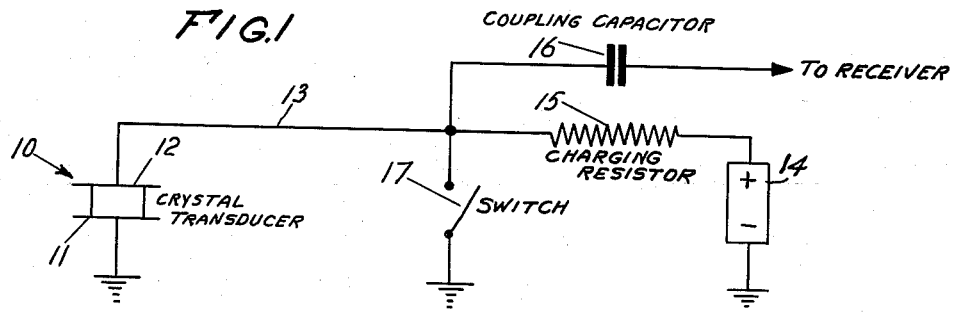
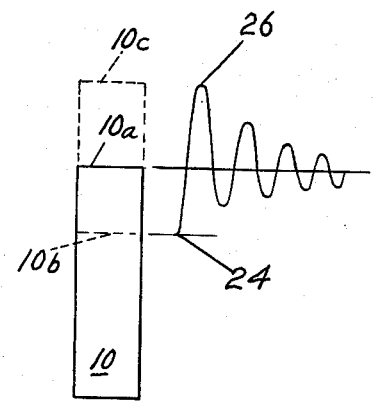
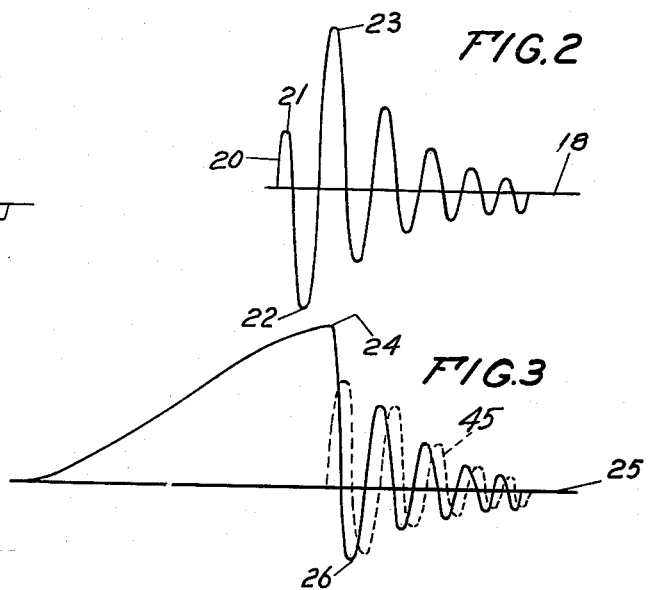
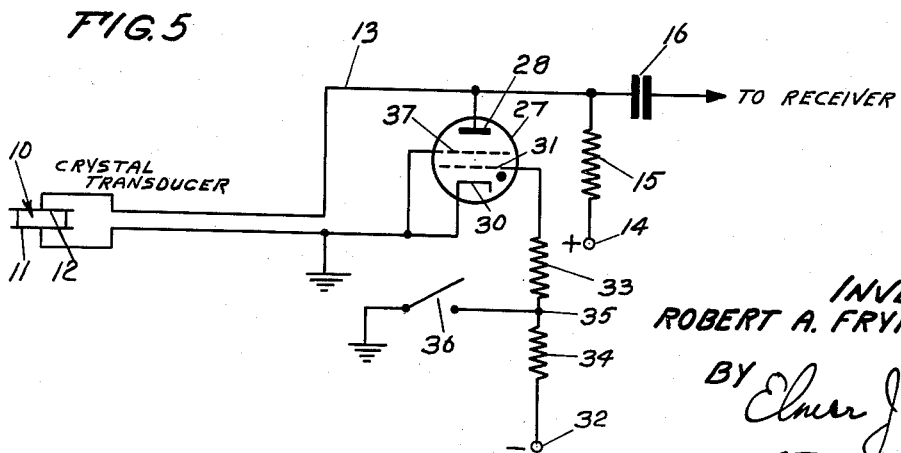
INVENTOR
ROBERT A. FRYKLUND
ATTORNEY

United States Patent Office 2,725,547
Patented Nov. 29, 1955

2,725,547

TRANSDUCER EXCITING CIRCUITS

Robert A. Fryklund, Dedham, Mass., assignor to Raytheon Manufacturing Company, Newton, Mass., a corporation of Delaware Application April 13, 1951, Serial No. 220,792

4 Claims. (Cl. 340—10)

This invention relates to the art of echo depth sounding and ranging and more particularly to novel methods and means for exciting electro-acoustic sources of pulse compressional wave energy.

In the art of echo depth sounding and ranging, it is often desirable to be able to indicate extremely short distances. The minimum distance that can be indicated when operating with a single transducer in a transceiver equipment depends upon the duration of the transmitted pulse and upon the speed of recovery of the receiver. The receivers can usually be designed to provide rapid recovery so the problem is one of obtaining the shortest practical pulse length.

Short pulse lengths can be obtained by shock exciting the transducer to produce a train of damped waves for the transmitted pulse. The train of oscillations must be highly damped for short range indication because, if the oscillations persist, they may keep the receiver in a state of overload, or blocked, and thus prevent an echo from being indicated.

Magnetostriction type transducers have previously been shock excited by such systems as that disclosed in the applicant's copending patent application, Serial No. 27,210, now Patent #2,561,851 dated July 24, 1951. In those systems, energy is stored in a capacitor and, to shock excite the transducer, the energy is discharged through a coil wound on a magnetostriction element, or the energy is discharged into a tuned circuit which in turn is coupled to the transducer. This technique has also been applied to crystal type transducers. In circuits of this type, even with the greatest possible efficiency, at least half of the energy applied to the circuit is dissipated in the impedance of the resonant circuit and less than half is available to produce compressional wave energy in the transducer. It is desirable to be able to reduce the amount of electrical energy required to provide a prescribed amplitude of vibration of a transducer.

It is another characteristic of circuits of this type that the transducer is without stress on it at the beginning of a pulse. When the oscillatory energy is first applied, the transducer is stressed and relieved and stressed in the opposite direction for one or more cycles until maximum compressional wave energy amplitude is produced. During this time the transducer is propagating compressional wave energy. If the oscillatory electrical energy is removed at this time the transducer will continue to alternately contract and expand until the energy is dissipated. The resulting train of compressional wave energy thus gradually increases in intensity to a maximum and then declines to zero amplitude after a time.

It is apparent that, if the period when the intensity increases to a maximum could be eliminated, and the transducer could be made initially to oscillate at its maximum intensity, the duration of the pulse of compressional waves produced by it could be reduced by the time presently necessary for the transducer to build up to maximum intensity. The present invention shows a means for accomplishing this desirable effect.

In accordance with the present invention, the transducer, that is the mechanical vibrator itself, is considered as the damped oscillator, and not as one part of a damped oscillatory electrical circuit. Electrical energy is added gradually and unidirectionally to the vibrator, and consequently gradually the physical potential energy stored in the transducer in the form of mechanical stress is built up to a high level limited only by the physical characteristics of the transducer itself. The physical dimensions of the transducer are then at an extreme. For example, in the case of a crystal, the contraction is at an extreme, and the crystal is maintained in this condition by a direct potential applied across a pair of opposite faces. In this condition the transducer may be likened to a displaced, stretched string before it is released by the displacing force or to a pendulum drawn back to one of its extreme positions. It is noteworthy that, during the stress-producing time, the transducer does not oscillate, and hence does not produce compressional wave energy. If, then, the stress-producing potential is abruptly discharged from the faces of the crystal, the strain is relieved and the effect is analogous to releasing a stretched string or displaced pendulum. The vibrator then proceeds through its train of damped oscillations, preferably with no coupling, to the original energy source. In this way the damped wave train is determined solely by the constants of the mechanical vibrator and by nothing else.

By the present invention a source of unidirectional current is connected across a transducer to build up a mechanical stress therein. In the case of a crystal, this is accomplished through a current-limiting resistor until a sufficient charge is built up to stress the crystal almost to the rupture point. It is then held there until a pulse of compressional waves is desired when the charge is drained off rapidly by connecting substantially a short-circuit path between the charged faces. The effect is to relieve the stress substantially instantaneously, and permit the crystal to vibrate at its natural frequency, propagating a damped train of compressional waves into the medium without drawing further energy from the electrical system.

The technique is the natural one to use with piezo-electric type transducers because the only energy used is that dissipated in the charging resistor which may be kept small and the additional small amount stored in the crystal as displacement potential energy. The discharge of the potential across the crystal faces is accomplished very simply with any switching device, preferably a vacuum tube or thyratron.

The circuit of the present invention is very simply and effective and is capable of charging a crystal transducer to its elastic limit and, therefore, to its maximum vibration amplitude. It produces a true damped oscillation of the vibrator.

Other and further objects, advantages and features of the invention will become apparent from the following description of three embodiments thereof reference being had to the drawings, wherein:

Fig. 1 is a schematic diagram of a preferred form of the invention;

Fig. 2 is a graph of the variation of stress with time when a prior circuit is used to shock excite a transducer;

Fig. 3 is a graph of the variations of stress with time when a transducer is excited by the means of a circuit according to the present invention, and also a graph of the resulting damped compressional wave train propagated;

Fig. 4 is an enlarged diagram showing the displacement of a crystal transducer by the means of the present invention with the amount of the displacement exaggerated for clarity; and Fig. 5 is a schematic diagram of another embodiment of the invention utilizing a gaseous discharge device as a switching means.

In Fig. 1 the reference numeral 10 designates a crystal transducer mounted between two electrodes 11 and 12, one (11) of which is connected to ground and the other (12) of which is connected over conductor 13 to a source of positive potential 14 through current-limiting resistor 15. The upper electrode 12 is also coupled through a capacitor 16 to a receiver (not shown) which may be of any of the designs customarily used with depth sounding and ranging equipment. This upper electrode 12 is also connected to ground through a normally open switch 17.

Before discussing the operation of the circuit of the present invention, the operation of a transducer excited by the afore-mentioned prior circuit will be briefly described. In this circuit, the transducer, when not oscillating, is in an unstressed condition, and energy must first be absorbed in applying the initial stress when oscillation is commenced. Fig. 2 shows a graph of a train of oscillations produced by such a transducer when it is caused to oscillate. The line 18 is a reference line and represents the unstressed condition of the transducer. It will be seen that the stress, illustrated by curve 20, rises from the reference level 18, in a "positive" direction to a point 21, in response to oscillatory electrical energy in the tuned circuit incorporating the transducer, and then reverses in sense. To illustrate this, curve 20 passes through the reference line 18 to a point 22 in a "negative" direction. The transducer vibrates under the influence of the oscillatory electrical energy, and due to its own elasticity. The vibration then reverses, and accordingly curve 20 passes through the reference line 18 again to a point 23 of maximum "positive" amplitude, the transducer acting still under the influence of the oscillatory electrical energy and its own elasticity. If at this point the oscillatory electrical energy is removed, the transducer will continue to oscillate with decreasing amplitude and with a character determined in part by the electrical nature of the circuit elements connected to it. The transducer thus vibrates and propagates compressional wave energy from the time the oscillatory current is first applied. The compressional waves produced have a pulse form which gradually rises to a peak and more gradually falls off. The time consumed in reaching the maximum amplitudes 23 represents an undesirable condition in an equipment to be used for short range measurements.

With the circuit of this invention, as shown in Fig. 1, the crystal transducer 10 is gradually stressed to a point which may be just below its rupture point by the application of the potential from the source 14 applied over the conductor 13 and through the resistor 15 across the electrodes 11 and 12. This initial potential produces a stress represented by the point 24 in the graph of Fig. 3. This stress is applied so gradually and the resistance of the resistor 15 is so high that there is no tendency for the crystal 10 to oscillate as long as the charge appears across its plates 11 and 12. This initial stress produces a compression from the normal dimension, shown by the line 10a of Fig. 4, to that shown by the line 10b. When the switch 17 is closed, this charge is removed through conductor 13, the switch 17, and the ground connections shown. With the potential difference between the faces 11 and 12 removed, the mechanical stress on the crystal is relieved, and the crystal tends to restore itself to its original dimensions, due to the elastic properties of the piezo-electric material. Due to the same properties, a stress is produced in the opposite direction in an amount represented by the line 10c in Fig. 4. The crystal thus proceeds to oscillate at a frequency determined solely by its mechanical constants and initially at maximum amplitude. A graph 10d illustrating the changing dimension of the crystal 10 with time is shown in Fig. 4. A similar (solid line) curve in Fig. 3 shows how the varying dimension of the crystal 10 changes from maximum contraction at 24 to maximum elongation at 26, about a reference line 25. A graph of the resulting compressional wave is shown in dotted lines 45 in Fig. 3. It will be seen from this dotted line curve 45 that compressional wave energy is not produced until the initial stress on the crystal 10 is relieved by the closing of switch 17. It will be seen by a comparison of Figs. 2 and 3 that, by virtue of the present invention, the duration of the compressional wave pulse is shortened by the time necessary for the transducer in the afore-mentioned prior circuit to reach its maximum stress, thus permitting the use of shorter pulses and the measurement of smaller depths and ranges. In addition, in the present invention, the leading edge, or initial portion, of the compressional wave pulse is substantially rectangular and this yields a sharp pulse which contributes to measuring accuracy.

Fig. 5 shows how a thyratron, or other discharge device, may be substituted for the switch 17 of Fig. 1. As before, the crystal 10 is between two electrodes 11 and 12. The lower one (11) of these electrodes is connected to ground and the upper one (12) is connected over conductor 13 to a source of suitable potential 14 through a current-limiting resistor 15 and is also coupled through a coupling capacitor 16 to a receiver, as in Fig. 1. The switch 17 of Fig. 1 is replaced in the circuit shown in Fig. 4 by a thyratron, or other gaseous discharge device 27, that has its plate 28 connected to the upper electrode 12 of the crystal 10 and its cathode 30 connected to ground. The first or control grid 31 of the thyratron is connected to a source (not shown) of negative potential via a terminal 32 through two resistors 33 and 34 in series. The junction point 35 of these two resistors 33 and 34 is connected to ground through a normally open switch or key 36. The second or screen grid 37 of the thyratron 27 is connected to ground. As before, the crystal 10 is initially stressed by the potential applied between the electrodes 11 and 12. The thyratron 27 is initially biased to a cut-off condition by the negative potential from the source 32 applied to its control grid 31. However, when the key 36 is depressed, the grid 31 is returned to ground potential through the resistor 33 and the tube 27 becomes conductive and removes the potential from across the crystal 10. Thereafter the operation is the same as for the circuit shown in Fig. 1, except that the thyratron 27 ceases to conduct when the voltage drop through the high resistance of resistor 15 reduces the plate voltage below the conducting point.

The switches or keys 17 of Fig. 1 and 36 of Fig. 4 are preferably of the ballistic, or other type, that makes only a momentary contact. Such a switch is shown in the applicant's copending application, Serial No. 57,100, filed October 28, 1948, now Patent No. 2,644,863, dated July 7, 1953.

This invention is not limited to the particular details of construction, materials and processes described, as many equivalents will suggest themselves to those skilled in the art. Thus, in particular, the magnitude of the resistor 15 may be chosen merely to prevent the crystal 10 from oscillating while the charge thereacross is being established, or its magnitude may be made greater to limit the current drawn from the source 14. This is valuable where battery operation is employed. In Fig. 5, this resistor 15 is employed further to provide that the tube 27 will be extinguished after it has served the function of relieving the electrostatic stress-producing charge across the crystal, and it will be appreciated in this connection that, when the tube is extinguished, the crystal is substantially prevented from further oscillating by the reapplication of the stressing potential, which has a strong damping effect. It is accordingly desired that the appended claims be given a broad interpretation commensurate with the scope of the invention within the art.

What is claimed is:

1. In apparatus for exciting an electro-acoustic transducer, the combination of a transducer having an inherent capacity, with electrical means to apply and maintain a stress across said transducer, said stress applying and maintaining means comprising a source of unidirectional electrical potential and the inherent capacity of the transducer, and switch means connected across the transducer to discharge the capacity and relieve the stress and permit the transducer to vibrate at a frequency determined by the mechanical characteristics of said transducer.

2. In apparatus for exciting a piezo-electric transducer, the combination of a piezo-electric transducer having inherent capacity, with means to apply and maintain an electrical potential across said transducer, said potential applying and maintaining means comprising a source of unidirectional electrical potential and the inherent capacity of the transducer, and means connected across the transducer to remove the electrical potential and permit the transducer to vibrate at a frequency determined by the mechanical characteristics of said transducer.

3. In apparatus for exciting a piezo-electric transducer, the combination of a piezo-electric transducer having inherent capacity, with means to apply and maintain an electrical potential across said transducer, said potential applying and maintaining means comprising a source of unidirectional electrical potential and the inherent capacity of the transducer, and means to remove the electrical potential and permit the transducer to vibrate at a frequency determined by the mechanical characteristics of said transducer, said stress removing means comprising a grid-controlled discharge device with a plate, a cathode and a grid, the plate-cathode path of the discharge device being connected across the transducer, and the grid connected to a source of negative potential and a normally open switch connecting the grid to ground when closed.

4. In apparatus for exciting a piezo-electric transducer, the combination of a piezo-electric transducer having inherent capacity, with means to apply and maintain an electrical potential across said transducer, said potential applying and maintaining means comprising a source of unidirectional electrical potential and the inherent capacity of the transducer, and means to remove the electrical potential and permit the transducer to vibrate at a frequency determined by the mechanical characteristics of said transducer, said stress removing means comprising a grid-controlled gaseous discharge device with a plate, a cathode and a grid, the plate-cathode path of the gaseous discharge device being connected across the transducer, and the grid connected to a source of negative potential and a normally open switch connecting the grid to ground when closed.

References Cited in the file of this patent

UNITED STATES PATENTS

| | | |
|---|---|---|
| 2,182,340 | Hearn | Dec. 5, 1939 |
| 2,233,992 | Wyckoff | Mar. 4, 1941 |
| 2,488,290 | Hansell | Nov. 15, 1949 |